United States Patent [19]

Roberts, Jr. et al.

[11] 4,317,731
[45] Mar. 2, 1982

[54] GAS ABSORBER

[75] Inventors: Thomas E. Roberts, Jr., Saratoga; John A. Abbott, San Mateo; Bruce M. Wright, San Jose, all of Calif.

[73] Assignee: FMC Corporation, Chicago, Ill.

[21] Appl. No.: 890,727

[22] Filed: Mar. 27, 1978

[51] Int. Cl.³ .............................. C02F 1/74; B01F 3/04
[52] U.S. Cl. .................................... 210/741; 210/744; 210/758; 210/104; 210/188; 210/220; 210/258; 261/91; 55/51
[58] Field of Search .............. 55/51, 184, 192; 210/7, 210/14, 15, 60, 63 R, 86, 104, 188, 195 R, 219, 220, 221 R, 258, 261; 261/91, 93

[56] References Cited

U.S. PATENT DOCUMENTS

| | | | |
|---|---|---|---|
| 2,413,838 | 1/1947 | Mallory | 210/221 R X |
| 2,560,526 | 7/1951 | Thompson | 261/91 X |
| 2,836,589 | 5/1958 | Allen, Jr. et al. | 261/93 X |
| 3,498,459 | 3/1970 | Bohnke | 261/91 X |
| 3,530,990 | 9/1970 | Grimshaw | 210/220 X |
| 3,840,216 | 10/1974 | Smith et al. | 210/14 X |
| 3,872,003 | 3/1975 | Walker | 210/220 X |
| 3,926,588 | 12/1975 | Speece | 210/63 R X |
| 3,979,293 | 9/1976 | Boulenger | 210/220 X |
| 4,000,227 | 12/1976 | Garrett | 261/93 |
| 4,043,771 | 8/1977 | Anand | 210/220 X |

Primary Examiner—Robert H. Spitzer
Attorney, Agent, or Firm—H. M. Stanley; R. B. Megley

[57] ABSTRACT

An absorber for increasing the concentration of oxygen in a solution has a pressure chamber therein which receives oxygen under pressure as well as a liquid to be oxygenated within an upper portion thereof. A shaft on which a turbine blade agitator is mounted is located in the upper portion of the chamber. The shaft is driven rotationally by a motor through a rotary seal in the pressure chamber cover. A baffle plate is mounted within the pressure chamber to define a lower portion therebeneath, which is in communication with the upper portion, but isolated from the agitation in the upper portion. The oxygen-liquid solution which drains into the lower portion is subsaturated and relatively quiescent, so that large oxygen bubbles therein disengage and rise into the upper portion, and entrained small bubbles therein dissolve in the subsaturated oxygen-liquid solution. Consequently, substantially all of the oxygen contained in the oxygen-liquid mixture is in solution when the oxygen-liquid solution is removed from the lower chamber.

16 Claims, 4 Drawing Figures

FIG_1

GAS ABSORBER

BACKGROUND OF THE DISCLOSURE

1. Field of the Invention

This invention relates to increasing the concentration of a dissolved gas in a quantity of liquid, and more particularly, to oxygenation of controlled volumes of aqueous fluids.

2. Description of the Prior Art

It is desirable for certain purposes to increase the concentration of dissolved gases within bodies of liquid. For example, it is advantageous to raise the concentration of dissolved oxygen in a body of sewage so that sewage treatment processes are accelerated. Such an application may require increased dissolution of air within a quantity of liquid for subsequent deposition in the body of sewage, or it may be desirable to dissolve molecular oxygen within a quantity of liquid and to thereafter mix the oxygen rich mixture into the body of sewage. Dissolution of air or oxygen into a body of liquid is accomplished at a relatively slow rate at atmospheric pressure and dissolution at superatmospheric pressure is therefore often attempted to accelerate the rate of dissolution. When molecular oxygen is utilized for dissolution into a liquid, loss of the oxygen which either does not enter into solution or comes out of solution prior to utilization of the oxygenated solution poses a cost problem since the molecular oxygen is a relatively expensive gas.

U.S. Pat. No. 3,926,588 issued to Speece discloses a gas transfer device within which absorption in a liquid of a gas from a pressurized source may be enhanced by pressurizing the gas-liquid mixture. The liquid is introduced through the top of a conical shaped chamber at a velocity exceeding the buoyant velocity of the bubbles of gas which are injected by a gas injector within the chamber. This results in an accumulation of bubbles at a stagnation zone within the chamber because the gasified liquid emerges from the bottom of the chamber at a velocity which is lower than the buoyant velocity of the gas bubbles. The accumulated gas in the stagnation zone which is not absorbed by the liquid is thereafter vented from the chamber and lost.

U.S. Pat. No. 3,799,511 issued to Svantesson discloses a device for mixing gas and liquid within a vessel which is located beneath the surface of a body of liquid by pumping air and liquid downwardly through a conduit to enter the vessel. The velocity of downward flow is sufficient to carry the air downward with the liquid. The mixture of gas and liquid is discharged from the lower open end of the conduit at a region near the bottom of the vessel. As the mixture of gas and liquid ascends upward within the vessel, some of the air is dissolved in the liquid. The air-liquid mixture is subjected to a superatmospheric pressure dependent upon the depth within the liquid body at which the vessel is placed. The gas-liquid mixture is retained within the vessel for a period of time which is sufficient to allow air to dissolve into the liquid within the vessel while out of physical contact with the main body of liquid outside the vessel. Excess gas within the vessel is continuously vented through a pipe attached thereto and is not recovered.

U.S. Pat. No. 3,530,990 issued to Grimshaw describes a sparger which includes a cylindrical container having a compressed air inlet and a vent at the top thereof. A liquid is introduced into the container together with compressed air until the pressure within the container reaches a predetermined level. At the predetermined pressure level a relief valve opens which allows continued introduction of pressurized air to force the aerated liquid from the container. Excess air is thereafter vented from the top of the container and lost.

It is therefore clear that a device for enhancing the concentration of a gas in solution in a quantity of liquid is desirable wherein that portion of the gas which either does not go into solution or which comes out of solution is recovered to be thereafter available for dissolution in another quantity of liquid.

SUMMARY OF THE INVENTION

In accordance with the present invention a gas absorber for dissolving a gas into a subsaturated quantity of liquid includes means providing an agitation chamber and further means providing a quiescent chamber which is in communication with the agitation chamber. Means is provided for admitting a pressurized gas into the agitation chamber. Means is also provided for admitting the subsaturated liquid into the agitation chamber. Structure within the agitation chamber is provided for mixing the subsaturated liquid with the gas to obtain a high concentration subsaturated gas-liquid solution. Increments of the high concentration gas-liquid solution flow from the agitation chamber into the quiescent chamber and remain therein for a sufficient period of time so that large bubbles of gas which are disengaged from the increments of the solution within the quiescent chamber float upwardly therein and are returned to the agitation chamber, and small bubbles of gas which are entrained in the subsaturated high concentration gas-liquid solution are dissolved in the solution.

The method of dissolving a gas into a liquid to obtain a high gas concentration mixture utilizes a chamber which is pressurized, and into one portion of which the gas and liquid is injected. The gas and liquid mixture is thereafter agitated in the one part of the chamber to obtain an increased gas concentration subsaturated solution. The liquid mixture in another part of the chamber is isolated from the agitation in the one part of the chamber while allowing flow of the subsaturated solution therebetween. The solution within the other part of the chamber is maintained in a quiescent condition so that large gas bubbles disengage from the stilled solution and return to the one part of the chamber to be reabsorbed and small gas bubbles dissolve in the subsaturated quiescent solution.

DESCRIPTION OF THE PREFERRED EMBODIMENTS

Figure 1:
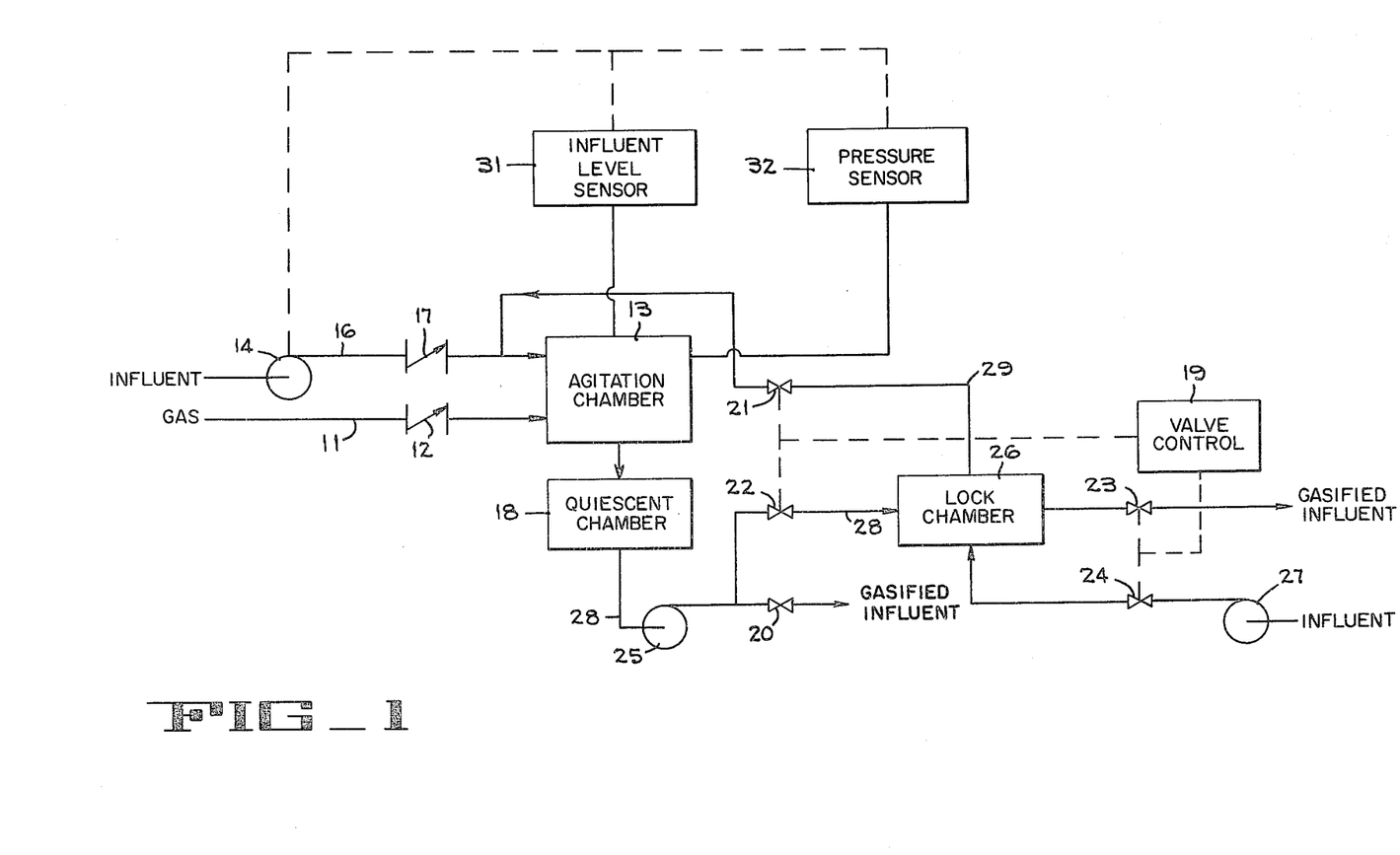
FIG. 1 is a block diagram of the improved gas absorber of the present invention and an oxygenating system in which it might be used.

A gas absorber in accordance with the present invention and an oxygenating system in which it might be used are shown in block diagram form in FIG. 1. The absorber of the present invention provides gas transfer efficiency which is markedly improved by comparison to known apparatus and methods utilized in gas absorption. A supply of gas under pressure is conducted via a conduit 11 and a check valve 12 into a pressure vessel containing an agitation chamber 13. An influent liquid is also introduced into the agitation chamber 13 by means of a high pressure pump 14 and a conduit 16 having a check valve 17 included therein. Influent liquid is also transmitted to agitation chamber 13 through another path to be hereinafter described. Gas and influent liquid is mixed within the agitation chamber 13 generally forming a solution having a high concentration of dissolved gas which is subsaturated at the pressure maintained within the agitation chamber 13. The high concentration subsaturated solution flows into a quiescent chamber 18 which is substantially isolated from the agitation within the chamber 13. The subsaturated solution is withdrawn from the quiescent chamber 18 in a fashion to be hereinafter described, but increments of the subsaturated solution remain within quiescent chamber 18 for a sufficient period of time for the larger bubbles to disengage from solution and to return to the agitation chamber 13. Since the solution is subsaturated at the pressure within the agitation and quiescent chambers 13 and 18, small gas bubbles entrained in the solution dissolve in the solution, thereby reducing the gas-liquid interfacial area and resulting in a more stable supersaturated solution if the pressure on the solution is subsequently reduced. There is therefore no gaseous phase transfer from the quiescent chamber 18 when the high concentration subsaturated solution under pressure is transferred therefrom. Any gas bubbles of any size which appear in chamber 18 will be returned to the agitation chamber 13 to be reabsorbed in a subsequent quantity of liquid. The ultimate effect of disengagement of the large bubbles and dissolution of the small bubbles is to produce a relatively stable supersaturated solution when the solution is depressurized. The stability results from the absence of gas in bubble form upon depressurization which would otherwise provide a gas-liquid interface which would then allow the dissolved gas to diffuse out of solution. Additionally, more time is made available within which to handle the supersaturated solution without losing the dissolved gas.

In certain applications a bubble free high gas concentration solution is desired which may be used in the pressurized condition. In such a case a valve 20 is provided through which the pressurized gasified solution may be drawn from the quiescent chamber 18. In applications where the high concentration subsaturated solution under pressure is to be returned to atmospheric pressure, such as in the oxygenation of a body of sewage to serve the respiratory needs of the biomass therein, an advantageous manner in which to bring the gas-liquid solution to atmospheric pressure is also known in FIG. 1. Such apparatus and method are disclosed in copending application U.S. Ser. No. 890,725 for an Improved Pressurized Oxygenation System and Method, said application being filed on even date herewith now U.S. Pat. No. 4,235,719. In general, with valve 20 in a closed position a valve control 19 operates to selectively and independently position valves 21, 22, 23 and 24 in either open or closed positions. Initially, a lock chamber 26 is filled with influent at atmospheric pressure by means of a pump 27 when valves 23 and 24 are set in their open positions. Valves 21 and 22 are in closed positions at this time. After the lock chamber is filled with new influent through valve 24, valve control 19 positions valves 23 and 24 in a closed position and opens valves 21 and 22. The high concentration gas subsaturated solution at high pressure from quiescent chamber 18 is transferred by a pump 25 through a conduit 28 and valve 22 into the lock chamber 26, simultaneously expelling the influent therein through a conduit 29 and valve 21 into agitation chamber 13. With lock chamber 26 filled with a high concentration gas subsaturated solution at high pressure, valve control 19 positions valves 21 and 22 in their closed positions and opens valves 23 and 24 in a manner whereby the pressure within the lock chamber 26 is relieved without significantly disturbing the quiescent state of the solution therein. The solution is then gas supersaturated at the lower pressure, which may be atmospheric pressure. The gas supersaturated solution is expelled from lock chamber 26 through valve 23 to a body of sewage, in this example, by influent which is pumped into lock chamber 26 through valve 24 by pump 27 in the manner aforedescribed. Since, at all stages of the transfer, the contents of the lock chamber 26 are substantially incompressible, little energy is required to build up pressure therein and little energy is lost when the pressure is relieved therein.

An influent level sensor 31 and a pressure sensor 32 are coupled to agitation chamber 13. A signal is provided by the influent level sensor 31 which is indicative of the level of influent within agitation chamber 13. If for any reason the influent level within agitation chamber 13 falls below a predetermined level, the signal from the influent sensor 31 is connected to energize the high pressure pump 14 and thereby introduce influent through conduit 16 and check valve 17 into the agitation chamber 13. Pressure sensor 32 provides a signal output which is indicative of the pressure within agitation chamber 13. If the pressure within the chamber 13 rises to an unsafe or undesirable level, the pressure signal is coupled to high pressure pump 14 to deenergize the pump and terminate the flow of influent through conduit 16 to the agitation chamber 13.

Figure 2:
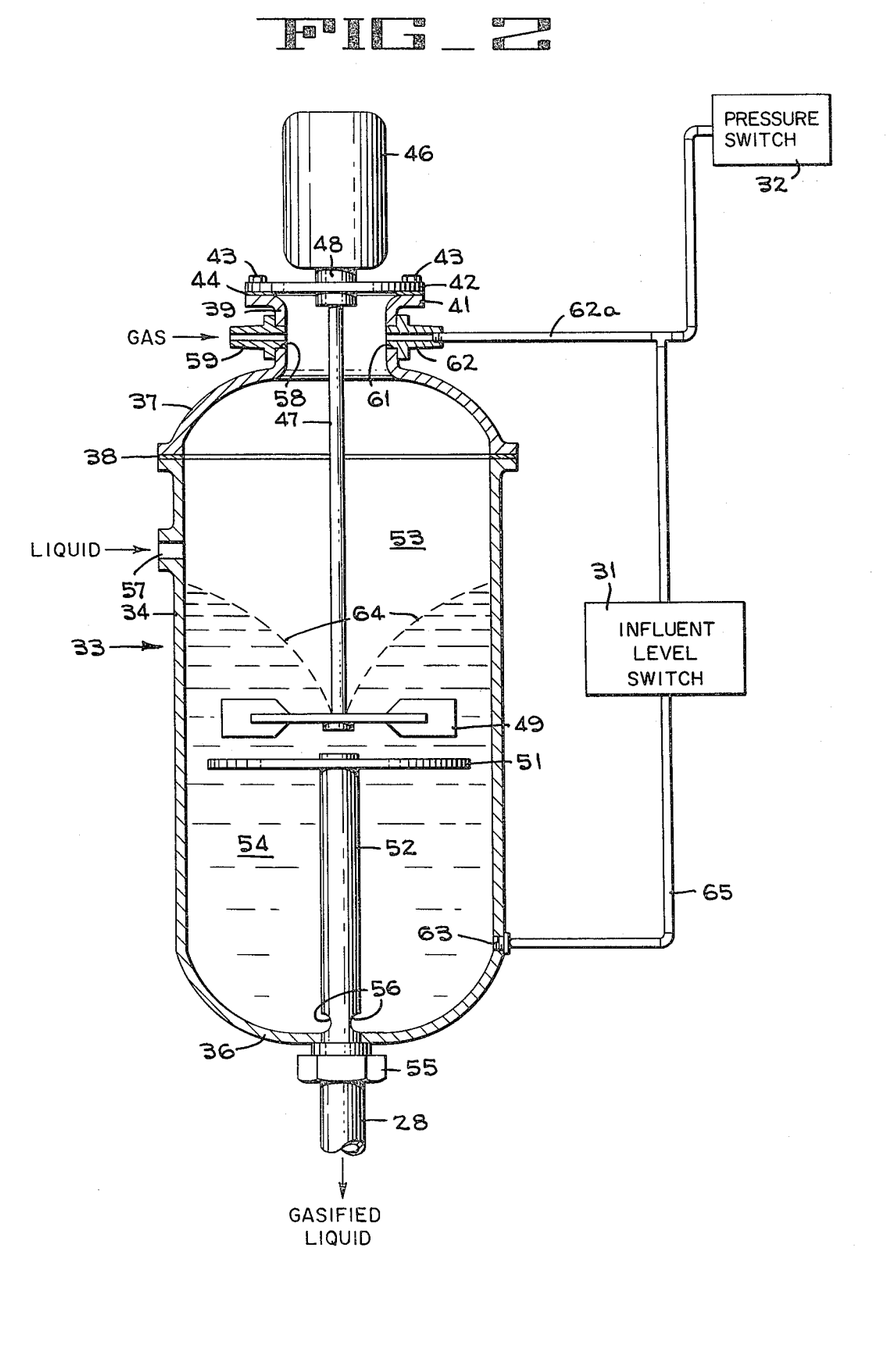
FIG. 2 is a vertical section through one embodiment of the gas absorber of the present invention.

One embodiment of the improved gas absorber is shown in FIG. 2 wherein a pressure vessel 33 includes a lower body portion 34 with a domed lower end 36 and a cover member 37. Lower body portion 34 and the cover member 37 have a sealing gasket 38 disposed therebetween and are joined together by any appropriate means such as bolts or clamps (not shown). Cover member 37 has an upper neck 39 and an upper annular flange 41. An upper cover plate 42 is fastened to upper flange 41 by means of bolts 43 engaging the flange and the cover plate. A sealing gasket 44 is disposed between the upper flange 41 and the upper cover plate 42. A motor 46 is mounted in the center of the upper cover plate 42 and is disposed to rotationally drive a shaft 47 through a sealed journal 48 mounted in upper cover plate 42, said shaft extending centrally within the pressure vessel. A turbine type paddle 49 is affixed to the lower end of the shaft 47 and rotates therewith.

A baffle plate 51 is mounted within the lower body portion 34 of the pressure vessel 33, said baffle plate generally being shaped as a circular disc having a periphery which is closely spaced from the inner wall of the lower body portion 34. Baffle plate 51 is mounted on a stanchion 52 which has its lower end affixed to the domed lower end 36 of pressure vessel 33. Baffle plate 51 divides the interior of pressure vessel 33 into an upper, or agitation, chamber 53 and a lower, or quiescent, chamber 54. Stanchion 52 is hollow having a closed uppermost end and a pair of apertures 56 through the wall thereof near the bottom of quiescent chamber 54. The outlet conduit 28 is in communication with the quiescent chamber 54 through the apertures 56 thereby providing an outlet for gasified liquid from quiescent chamber 54. Outlet conduit 28 is secured in place by a pipe collar 55.

The wall of the lower body portion 34 of the pressure vessel 33 has an aperture 57 therethrough which extends into the upper end of the agitation chamber 53. Liquid influent is introduced into the agitation chamber 53 through aperture 57. The upper neck 39 on pressure vessel 33 has a radially extending aperture 58 therethrough in which a fitting 59 is secured. Fitting 59 has a bore therethrough for introducing gas under pressure into the agitation chamber 53. Upper neck 39 also has a second radially extending aperture 61 therethrough in which is secured a fitting 62. Fitting 62 has a bore therethrough communicating the agitation chamber 53 with the pressure sensor 32 through a tube 62a. Pressure and influent level sensors 32 and 31 in this embodiment appear respectively as a conventional pressure switch set to provide an output signal when the pressure exceeds a predetermined level and a conventional influent level switch set to provide an output signal when the level of fluid in a tube 65 is below a preset end. The tube 65 is connected to a level sensor aperture 63 at the lower end of the pressure vessel, and the upper end of the tube is interconnected with the pressure sensing tube 62a at the top of the vessel. Influent level switch 31 is thus exposed to the pressure in the agitation chamber 53 at its upper end and is in communication with the liquid in quiescent chamber 54 through level sensor aperture 63.

The manner in which the embodiment of FIG. 2 functions will now be described. Influent liquid is admitted through aperture 57 into agitation chamber 53. Pressurized gas is admitted through fitting 59 into agitation chamber 53, thereby pressurizing the chamber. Influent level switch 31 senses the level of the influent within pressure vessel 33 activating the high pressure pump 14 of FIG. 1 when necessary to provide enough influent to maintain a predetermined liquid level within agitation chamber 53. Should the pressure within the pressure vessel 33 rise to too high a level, due to a failure of influent level switch 31, for example, with consequent overfilling of agitation chamber 53, pressure switch 32 will deenergize pump 14 at a predetermined maximum pressure.

Motor 46 drives shaft 47 and turbine paddle 49 to violently agitate the influent and gas within agitation chamber 53. The influent within agitation chamber 53 is rapidly stirred to form a vortex, indicated by the dotted lines 64 in FIG. 2, within chamber 53 and to generally increase the interfacial area between the influent and the gas to thereby obtain a high concentration of dissolved gas in the influent. The absorber is operated so that the gas-influent mixture is subsaturated at the pressure within the pressure vessel 33 during its residence time in the agitation chamber 53, and the mixture flows downwardly between the periphery of baffle plate 51 and the inner surface of the wall of lower body portion 34 into the quiescent chamber 54. The high concentration subsaturated solution is stilled within quiescent chamber 54, and increments of the gas-influent solution are resident therein for a sufficient period of time so that larger bubbles will have time to disengage from the solution and rise up to the agitation chamber to be reabsorbed in subsequent quantities of influent and smaller bubbles will be entrained in the influent within quiescent chamber 54 and dissolved therein. Thus, substantially no undissolved gas is emitted through apertures 56 and conduit 28 when the gasified liquid is withdrawn from quiescent chamber 54.

Figure 3:
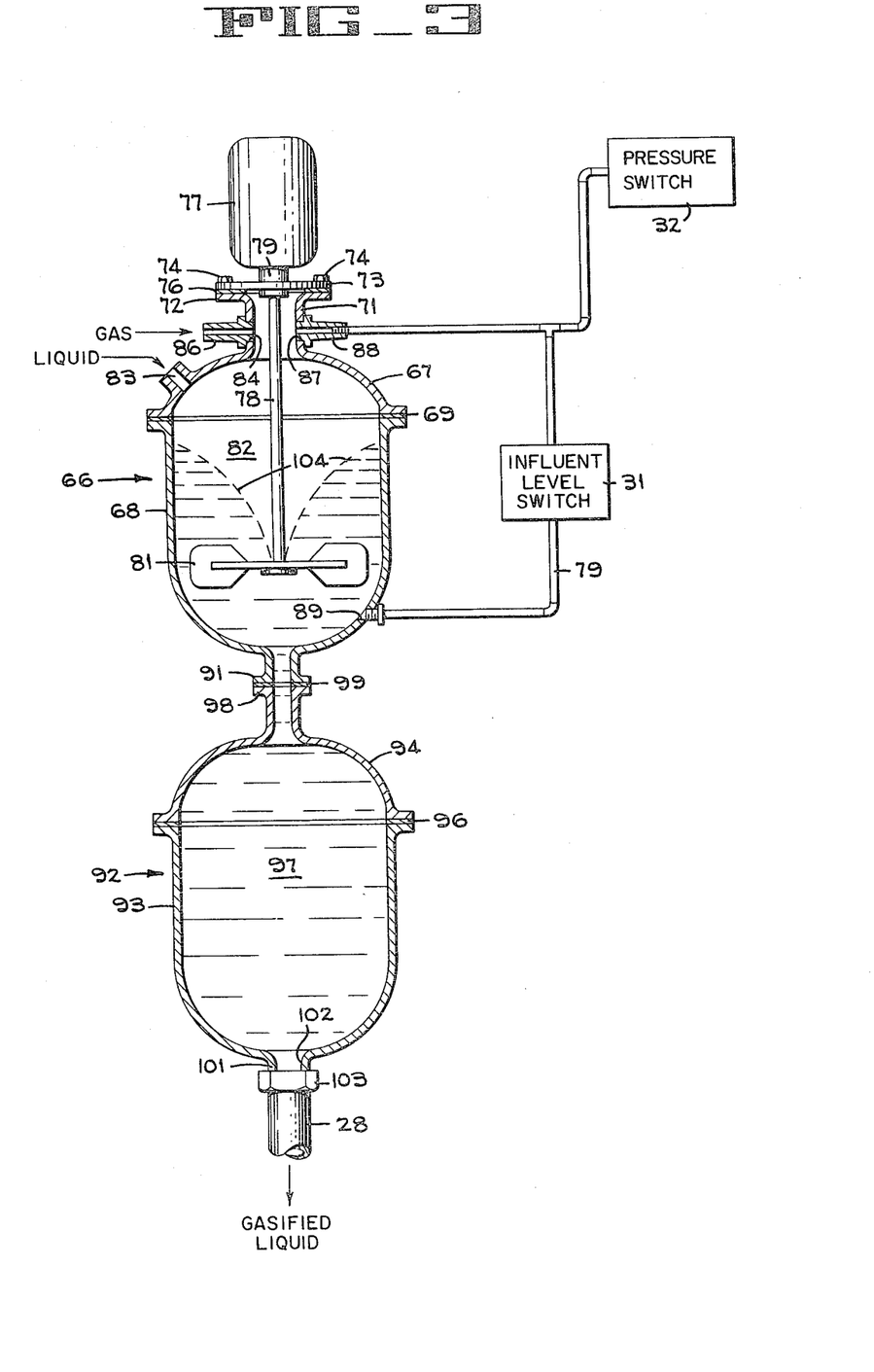
FIG. 3 is a vertical section through another embodiment of the gas absorber of the present invention.

In FIG. 3 another embodiment of the gas absorption apparatus for performing the gas absorption process disclosed herein is shown. An upper pressure vessel 66 is generally cylindrical in shape with a cover member 67 and a lower body member 68. Lower body member 68 and cover member 67 are fastened together by means such as bolts or clamps (not shown) and having a sealing gasket 69 disposed therebetween.

Cover member 67 has an upper neck 71 upon which an upper annular flange 72 is formed. An upper cover plate 73 is fastened to the upper annular flange 72 by means of bolts 74 with a sealing gasket 76 disposed therebetween. A motor 77 is mounted on the upper cover plate 73 to drive a shaft 78 through a sealed journal 79 which is mounted in the upper cover plate 73. A turbine type paddle 81 is mounted on the end of the shaft 78 for rotation therewith.

Upper pressure vessel 66 defines an agitation chamber 82 therein in which the turbine paddle 81 is disposed to rotate. Cover member 67 has an aperture 83 through which liquid influent is admitted into the agitation chamber 82. Upper neck 71 on cover member 67 has a radially extending aperture 84 therethrough in which is secured a fitting 86. Fitting 86 has a through bore through which gas under pressure is admitted to the agitation chamber 82. Upper neck 71 also has a radially extending aperture 87 therethrough in which is secured another fitting 88 which has a through bore. Agitation chamber 82 is communicated with the pressure switch 32 through the bore in fitting 88 in the same manner as that disclosed with respect to the embodiment of FIG. 2. Level switch 31 is pressurized at the pressure of agitation chamber 82 through the bore in fitting 88 and is in communication with the fluid in the agitation chamber 82 through a level sensing tube 79 connected with the agitation chamber below the normal fluid level therein through an aperture 89 through the wall of lower body member 68.

Lower body member 68 has a lower neck and annular flange 91 thereon which surrounds an exit passage from agitation chamber 82. A lower pressure vessel 92 has a lower body member 93 and a cover member 94. Lower body member 93 and cover member 94 are fastened together by means of bolts or clamps (not shown) with a sealing gasket 96 disposed therebetween, thereby forming a lower, or quiescent, chamber 97 therein. Cover member 94 has an upper neck that has an annular flange 98 thereon which is secured to the annular flange 91 on lower body member 68 by appropriate means such as bolts or clamps (not shown). A sealing gasket 99 is disposed between flange 91 and flange 98. Upper neck and flange 98 surround an inlet passageway to quiescent chamber 97. Lower body member 93 has a lower neck 101 surrounding an exit aperture 102 at the bottom of quiescent chamber 97. The outlet conduit 28 is secured to lower neck 101 in communication with the exit aperture 102 by means such as a pipe collar 103.

The embodiment of FIG. 3 functions to enhance the gas concentration within a body of liquid with substantially no loss of gas outside the solution. Quiescent chamber 97 is assumed initially to be filled with a solution in which there is a high concentration of dissolved gas but which is subsaturated at the pressure imposed on the solution. Liquid is admitted to agitation chamber 82 through the aperture 83 together with gas under pressure through the fitting 86. Consequently, the gas and liquid within agitation chamber 82 is subjected to the pressure imposed thereon by the pressure in the gas supply. Motor 77 drives the turbine paddle 81 to violently agitate the liquid therein, thus forming a vortex represented by the dotted lines 104. Gas is thereby intermixed with the liquid due to the increase in gas-liquid interfacial area. When gasified liquid is withdrawn from quiescent chamber 97 through conduit 28, the gas-liquid solution in agitation chamber 82 flows through the lower neck of vessel 66 and the upper neck of vessel 92 into the quiescent chamber 97 where it is stilled. The time during which an increment of liquid is exposed to the gas under pressure in agitation chamber 82 is such that the liquid has a high dissolved concentration, but is yet subsaturated at the pressure imposed on the liquid by the gas supply. The solution within quiescent chamber 97 is substantially isolated from the agitation within agitation chamber 82 by the narrow neck or passageway extending therebetween. Since quiescent chamber 97 is located at a lower elevation than agitation chamber 82, any large bubbles of gas which disengage from the solution within quiescent chamber 97 will rise through the narrow connecting passageway between the vessel 66 and 92 to reenter agitation chamber 82. Thus, gas escaping from solution within quiescent chamber 97 is conserved for future absorbance by a subsequent quantity of the influent liquid. Since the solution in the quiescent chamber is subsaturated, small bubbles entrained within the fluid therein should ultimately dissolve. Consequently, substantially no free gas emerges through exit aperture 102 when gasified liquid is withdrawn from quiescent chamber 97. The transit time of an increment of gas-liquid solution through quiescent chamber 97 should be sufficient to allow the aforementioned disengagement of large gas bubbles and the dissolution of small gas bubbles.

As described hereinbefore, liquid level switch 31 provides a signal indicating that the level of the influent within agitation chamber 82 is below a predetermined level. The low liquid level signal is connected to energize high pressure pump 14, fluid is pumped into the chamber 82, and the level therein is brought back up to the desired level. Pressure switch 32 provides a signal when the pressure within the agitation chamber 82 exceeds a predetermined maximum pressure. The signal from the pressure switch 32 is also connected to the high pressure pump 14 to deenergize the pump until the pressure within chamber 82 returns to a level below the predetermined maximum.

Figure 4:
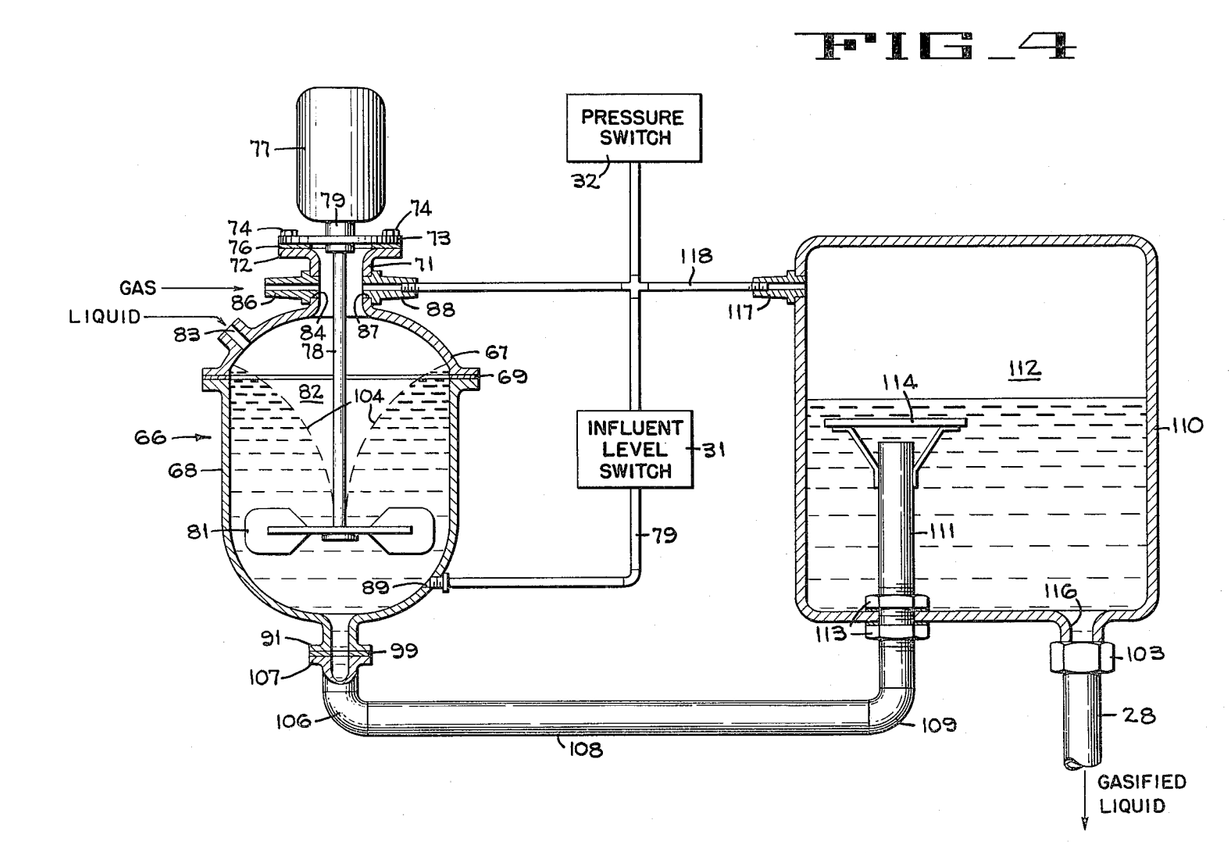
FIG. 4 is a vertical section through yet another embodiment of the gas absorber of the present invention.

In FIG. 4 another embodiment of the gas absorption apparatus for performing the gas absorption process disclosed herein is shown. A pressure vessel 66 is shown which is of the same general configuration as described for pressure vessel 66 in the embodiment of FIG. 3 described herein. Like item numbers are applied to those items which are the same as those discussed in conjunction with FIG. 3. An elbow 106 having an annular flange 107 thereon is fastened to the lower neck and annular flange 91 on the lower body member 68 with the sealing gasket 99 disposed therebetween. A lateral conduit 108 is coupled between the elbow 106 and another elbow 109. The elbow 109 is coupled to a standpipe 111 which passes in sealable fashion through the bottom of another sealed pressure vessel 110. The pressure vessel defines a quiescent chamber 112 therein. The standpipe 111 is held securely in place within the quiescent chamber 112 by means of opposing pipe collars 113 which engage the standpipe and the wall of the pressure vessel 110.

A baffle plate 114 is attached to the top of standpipe 111 extending across the open upper end thereof so that gasified influent conducted into the quiescent chamber 112 through the lateral conduit 108 will be deflected to disperse within the charge of gasified influent contained in the quiescent chamber. An eflux port 116 is provided in the bottom of the sealed pressure vessel 110 providing an outlet from quiescent chamber 112. Port 116 is coupled by means of the pipe coller 103 to the outlet conduit 28. A fitting 117 is sealably secured in one wall of the pressure vessel 110 near the upper portion thereof. The fitting 117 is communicated with the quiescent chamber 112 and is coupled to a conduit 118 which communicates through fitting 88 with the agitation chamber 82 within the pressure vessel 66.

As in the embodiments previously described, the embodiment of FIG. 4 operates to increase the concentration of gas within a body of liquid with substantially no loss of gas as the gasified influent is discharged through the outlet conduit 28. Assuming the quiescent chamber 112 to be initially filled with a solution in which there is a high concentration of dissolved gas, but which is subsaturated at the pressure imposed upon the solution, liquid is admitted to the agitation chamber 82 through the aperture 83 together with gas under pressure through the fitting 86. As described hereinbefore, the gas and liquid within the agitation chamber 82 is subjected to the pressure imposed thereon by the gas supply pressure. The motor 77 drives the turbine paddle 81 to violently agitate the liquid therein and to intermix the gas with the liquid due to the increased gas-liquid interfacial area.

As the gasified influent is withdrawn from the quiescent chamber 112 through the outlet conduit 28 the tendency for the heads in each of the chambers to equalize causes the intermixed gas-liquid solution within the agitation chamber 82 to flow through the lateral conduit 108 and to restore the level of gas-liquid solution within the quiescent chamber 112. The level of the solution within the quiescent chamber 112 will depend upon the leve maintained within the agitation chamber 82, which in turn is controlled by the influent level switch 31 in a manner described heretofore. Level switch 31 and pressure switch 32 are both communicated with the conduit 118 extending between the agitation and quiescent chambers and function as described hereinbefore in connection with the other embodiments of this invention. The gasified influent conducted through the lateral conduit 108 is emitted from the upper end of the standpipe 111 and deflected by the baffle plate 114. The increments of gasified solution are therefore dispersed within the quiescent chamber 112 and are not allowed to splash into the head space above the solution contained within the quiescent chamber. Thus, the increments of gasified solution are maintained within the body of liquid within the quiescent chamber for an average predetermined amount of time prior to being withdrawn through the eflux port 116 and the outlet conduit 28. The residence time for the gasified solution within the quiescent chamber 112 is sufficient to allow larger bubbles to disengage and float upwardly to the head space above the liquid-gas mixture therein and for the smaller bubbles entrained within the solution to ultimately dissolve. Consequently, substantially no free gas emerges through the eflux port 116 when the gasified liquid is withdrawn from the quiescent chamber 112. The gas which disengages from the solution is free to traverse through the conduit 118 from the head space within the quiescent chamber 112 into the head space above the influent liquid being agitated within the agitation chamber 82. As in the previously described embodiments of this invention, gas escaping from the charge of gasified influent within the quiescent chamber 112 is conserved and returned to the agitation chamber 82 for reabsorption. Gas which is entrained within the charge of gasified influent within the quiescent chamber is absorbed therein during the dwell time within the chamber so that a high concentration subsaturated solution at the pressure within the quiescent chamber is obtained.

It should be noted that although the system shown in FIG. 1 wherein the absorber of the present invention is used in a batch type system, the absorber of the present invention is by no means limited to a batch type operation but is, in fact, designed to operate continuously during normal operation conditions. That is to say, the absorber is designed to operate with gas and influent continuously being supplied thereto and with gasified solution continuously being removed therefrom. In the FIG. 1 system, this is accomplished by having two or more lock chambers 26 serviced by the absorber and by switching between the lock chambers to maintain continuous movement of fluid through the absorber.

By way of example, either of the embodiments of FIGS. 2, 3 and 4 should be capable of oxygenating 400 gallons of water per minute to a concentration of 350 milligrams of oxygen per liter. Molecular oxygen would thereby be introduced into the agitation chamber at a rate of 1,680 pounds per day at a pressure of 200 psig and would be mixed with water introduced into the agitation chamber at a rate of 400 gallons per minute. The volume of the quiescent chamber in such a device would be approximately 32 cubic feet so that an incremental volume of subsaturated solution at the oxygen supply pressure is present within the quiescent chamber for about 36 seconds prior to being withdrawn therefrom.

A gas absorption apparatus and method has been disclosed which utilizes substantially all of the gas supplied thereto to increase the dissolved gas concentration level in a body of liquid introduced thereto. Moreover, the gasified liquid provided through this apparatus and method may be depressurized so that is assumes a supersaturated state wherein it can be subsequently transported for limited periods of time without losing appreciable amounts of gas from the solution through effervescence. It has been found that when a volume of the oxygenated liquid processed in accordance with the present invention is returned to atmospheric pressure that its metastable characteristic will allow it to be transferred for three to five seconds before appreciable effervescence begins to occur if it is transferred without substantial agitation. Thus, within this short transfer time the supersaturated liquid can be diluted with a large body of subsaturated liquid to increase the dissolved oxygen level of the latter.

Although the best modes contemplated for carrying out the present invention have been herein shown and described, it will be apparent that modification and variation may be made without departing from what is regarded to be the subject matter of the invention.

What is claimed is:

1. A method of dissolving high concentrations of a gas into a liquid within a chamber, comprising the steps of pressurizing the chamber, injecting the gas and liquid into the upper part of the chamber, agitating the gas and liquid mixture in the upper part of the chamber to obtain an increased gas concentration subsaturated solution at the chamber pressure, isolating the gas and liquid mixture in the lower part of the chamber from the agitation in the upper part of the chamber while allowing flow of the subsaturated solution into the lower part of the chamber, holding the solution in the lower part of the chamber so that the increased gas concentration subsaturated solution becomes substantially quiescent therein, whereby large gas bubbles disengage from the subsaturated solution in the lower part of the chamber and rise to the upper part of the chamber and small gas bubbles dissolve in the subsaturated solution in the lower part of the chamber, and withdrawing the solution from the lower part of the chamber after substantially all of the large bubbles have disengaged and the small bubbles have dissolved.

2. A method as in claim 1 together with the steps of sensing the level of the liquid in the upper part of the chamber, and replenishing the liquid therein when the level falls below a predetermined level.

3. A method as in claim 2 together with the steps of sensing the pressure within the chamber, and stopping the step of replenishing when the pressure exceeds a predetermined pressure.

4. A method as in claim 1 wherein said steps are carried on on a continuous basis so that liquid is continuously entering and exiting from said chamber.

5. A method of dissolving high concentrations of a gas into a liquid, comprising the steps of injecting the gas and liquid into a confined space, pressurizing the confined space, agitating one portion of the gas and liquid within the confined space to obtain a pressurized increase gas concentration subsaturated solution, isolating another portion of the increased gas concentration subsaturated solution from the agitation, communicating the isolated portion with the agitated portion so that the solution and gas passes freely therebetween, holding the isolated portion so that the solution becomes substantially quiescent and small gas bubbles dissolve within the quiescent portion, directing larger gas bubbles which disengage from the quiescent subsaturated solution to return to the agitated portion to be reabsorbed in the liquid therein, and withdrawing the quiescent solution from the confined space after substantially all of the large bubbles have disengaged and the small bubbles have dissolved.

6. A method as in claim 5 together with the step of placing the isolated portion below the agitated portion, wherein the step of communicating occurs between the lower part of the agitated portion and the upper part of the quiescent portion, whereby the free passage of the solution is downward and the free passage of the gas is upward.

7. A method as in claim 5 together with the step of placing the isolated portion at substantially the same elevation as the agitated portion, wherein the step of communicating occurs between the lower parts of the agitated and quiescent portions, whereby the free passage of the solution is lateral therebetween, and wherein communicating further occurs between the upper parts of the agitated and quiescent portions, whereby the free passage of gas is effected therebetween.

8. A method as in claim 7 together with the step of creating a headspace within the confined space overlying each of the agitated and quiescent portions, the communication between the upper parts thereof being between the headspaces.

9. In an absorber for gasifying a liquid wherein the liquid and a gas are introduced together under pressure into a vessel defining a first sealed chamber having means disposed therein for violently agitating the resulting gas-liquid mixture so that the liquid-gas interface is increased and dissolution of the gas in the liquid is enhanced, and wherein the absorber includes means for discharging the gasified liquid from the vessel, the improvement comprising a separate pressure vessel defining a second sealed chamber, a conduit extending between the vessel defining the first sealed chamber and said separate pressure vessel, for communicating said first and second sealed chambers and for conducting the gas and the liquid freely therebetween, said second sealed chamber being disposed to receive the gas-liquid mixture through said conduit and to hold the gas-liquid mixture therewithin for a predetermined period of time, said means for discharging communicating with said second chamber, whereby small gas bubbles within said second sealed chamber are dissolved in the liquid therein within said predetermined period of time and large bubbles are disengaged from the liquid and returned through said conduit to said first sealed chamber.

10. An absorber as in claim 9 wherein said second sealed chamber is positioned at substantially the same elevation as the first sealed chamber, and wherein said conduit further comprises an additional conduit extending between the upper portions of said first and second sealed chambers.

11. In an absorber for gasifying a liquid wherein the liquid and a gas are introduced together under pressure into a vessel defining a first sealed chamber having means disposed therein for violently agitating the resulting gas-liquid mixture so that the liquid-gas interface is increased and dissolution of the gas in the liquid is enhanced, and wherein the absorber includes means for discharging the gasified liquid from the vessel, the improvement comprising means for defining a second sealed chamber, means for communicating said first and second sealed chambers and for conducting the gas and the liquid freely therebetween, said second sealed chamber being disposed to receive the gas-liquid mixture through said means for communicating and to hold the gas-liquid mixture therewithin for a predetermined period of time, said means for discharging communicating with said second chamber, whereby small gas bubbles within said second sealed chamber are dissolved in the liquid therein within said predetermined period of time and large bubbles are disengaged from the liquid and returned through said means for communicating to said first sealed chamber, a level sensor providing an indication of liquid level in said first sealed chamber, and means for providing liquid to said first sealed chamber when the liquid level therein falls below a predetermined liquid level.

12. An absorber as in claim 11 wherein said means for providing liquid includes a pump responsive to said indication of liquid level, together with a pressure sensor connected to deenergize said pump when pressure within said first and second sealed chambers exceeds a predetermined pressure level.

13. A gas absorber for dissolving gas in a subsaturated liquid, comprising means for providing an agitation chamber includes a first pressure vessel, means for providing a quiescent chamber includes a second pressure vessel, means for admitting gas under pressure into said agitation chamber, means for admitting the subsaturated liquid into said agitation chamber, a conduit extending between said agitation and quiescent chambers operating to freely pass the liquid and gas admitted to said agitation chamber between said chambers, means for agitating the subsaturated liquid and the gas in said agitation chamber, whereby the gas-liquid interface area is increased and a subsaturated solution with a high concentration of gas mixed therein is provided, and means for withdrawing the subsaturated high gas concentration solution from said quiescent chamber following a predetermined dwell time therein, whereby during said predetermined dwell time large bubbles of gas which are disengaged from the liquid in said quiescent chamber float upwardly therein and are returned to said agitation chamber through said conduit and small bubbles of gas which are entrained in the liquid are dissolved in the subsaturated solution within said quiescent chamber.

14. A gas absorber for dissolving gas in a subsaturated liquid, comprising means for providing an agitation chamber, means for providing a quiescent chamber, said means for providing a quiescent chamber being located at substantially the same elevation as said means for providing an agitation chamber, means for admitting gas under pressure into said agitation chamber, means for admitting the subsaturated liquid into said agitation chamber, means for communicating said agitation and quiescent chambers operating to freely pass the liquid and gas admitted to said agitation chamber between said chambers, said last named means including means for passing gas-liquid mixture extending between the bottom portions thereof, and means for passing disengaged gas extending between the upper portions thereof, means for agitating the subsaturated liquid and the gas in said agitation chamber, whereby the gas-liquid interface area is increased and a subsaturated solution with a high concentration of gas mixed therein is provided, and means for withdrawing the subsaturated high gas concentration solution from said quiescent chamber following a predetermined dwell time therein, whereby during said predetermined dwell time large bubbles of gas which are disengaged from the liquid in said quiescent chamber float upwardly therein and are returned to said agitation chamber through said means for communicating and small bubbles of gas which are entrained in the liquid are dissolved in the subsaturated solution within said quiescent chamber.

15. A gas absorber for dissolving oxygen into a body of liquid comprising a pressure vessel having a pressure chamber therein and having an oxygen inlet adapted to be coupled to a pressurized oxygen supply, a liquid inlet adapted to be coupled to a liquid supply, and an oxygenated liquid outlet, a baffle plate mounted within said pressure chamber being disposed therein so that an upper and a lower chamber are defined therein having a narrow unobstructed path therebetween, said oxygen and liquid inlets providing access to said upper chamber, and said oxygenated liquid outlet providing egress from said lower chamber, means for mixing oxygen and liquid in said upper chamber so that a high oxygen concentration subsaturated mixed solution is formed therein, whereby the subsaturated mixed solution flows into and fills said lower chamber, attaining a quiescent state therein and being present therein for a sufficient length of time so that the larger bubbles of oxygen are disengaged from the liquid and rise back to said upper chamber and the smaller oxygen bubbles entrained in the subsaturated mixed solution are dissolved therein, a pump coupled between said pressure vessel liquid inlet and the liquid supply, and a level sensing switch connected to said pressure vessel and providing an output signal when the level in said pressure vessel falls below a predetermined level, said output signal being connected to energize said pump, whereby said predetermined level is maintained.

16. A gas absorber as in claim 15 together with a pressure limit switch connected to said pressure vessel and providing a pressure limit signal when the pressure within said pressure vessel exceeds a predetermined pressure, said pressure limit signal being connected to deenergize said pump, whereby no liquid is pumped into said pressure vessel when pressure therein exceeds said predetermined pressure.

* * * * *